J. H. CALDWELL.
DISK PLOW.
APPLICATION FILED APR. 27, 1921.
1,404,577.
Patented Jan. 24, 1922.
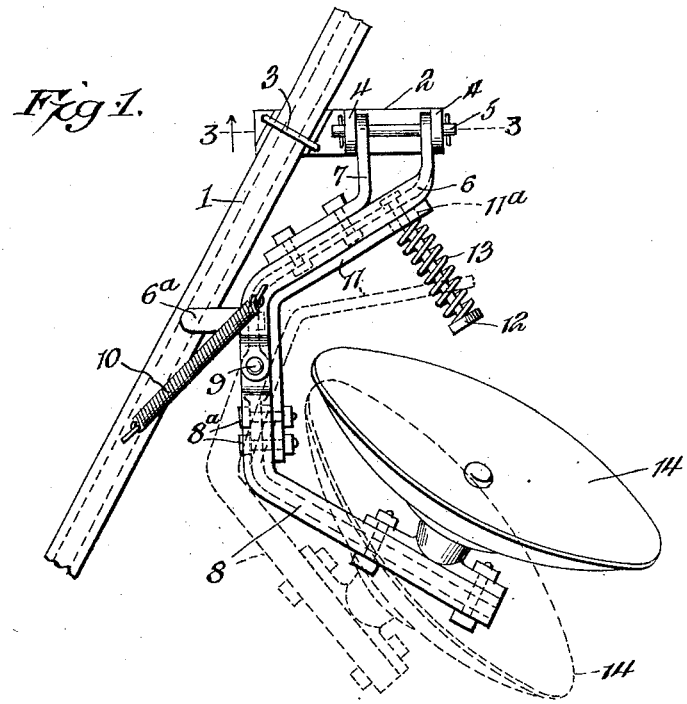
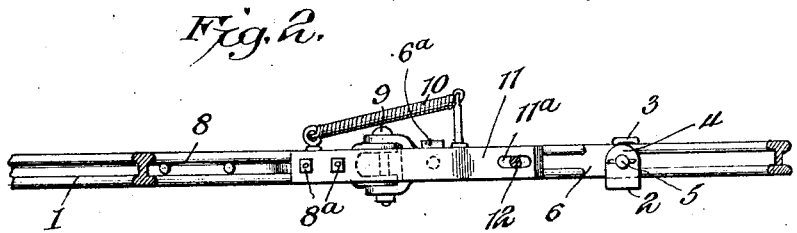
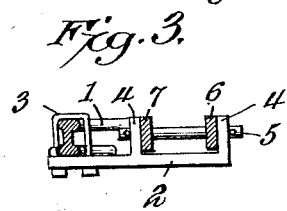 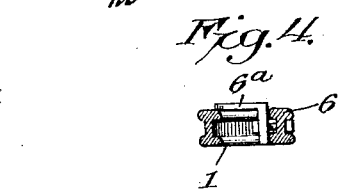
John H. Caldwell, INVENTOR.
BY James J. Wheeley & Co.,
ATTORNEYS.

UNITED STATES PATENT OFFICE.

JOHN H. CALDWELL, OF WENONA, ILLINOIS.

DISK PLOW.

1,404,577.  Specification of Letters Patent.  Patented Jan. 24, 1922.

Application filed April 27, 1921. Serial No. 464,805.

*To all whom it may concern:*

Be it known that I, JOHN H. CALDWELL, a citizen of the United States, residing at Wenona, in the county of Marshall and State of Illinois, have invented new and useful Improvements in Disk Plows, of which the following is a specification.

My present invention pertains to wheeled disc plows, and it contemplates the provision of a device of the nature specified that is simple and inexpensive in construction and one by which farming lands containing stones, roots, stumps and the like may be easily and conveniently plowed.

The invention further contemplates a construction of disc plow whereby, irrespective of the nature of the ground being worked, as much plowing may be done as would be the case were the ground free of obstructions, but it should be remembered that said obstructions should be low enough to permit clearage of the doubletrees and plow frame to which my improvements are secured.

The invention in all of its details will be fully understood when the same are read in connection with the drawing accompanying and forming part of this specification in which:

Figure 1 is a top plan view of a portion of a plow frame and showing the attachment of my device to said frame. The view also illustrates in dotted lines the position assumed by various parts, when the disc strikes an obstruction in a field.

Figure 2 is a side elevation of the movable arms and block and their relation to the frame of the plow.

Figure 3 is a view taken in the plane indicated by line 3—3 of Figure 1 and looking in the direction of the arrows.

Figure 4 is a detail view of the strap or device I employ to prevent the disc from dropping deeper than would be desirable with respect to the frame.

Similar numerals of reference designate corresponding parts in all the views of the drawings.

My novel device is secured to the ordinary well known frame 1 of a disc plow which frame comprises one or more parallel beams to which the front furrow wheel and hitch is fixed to the forward end, and the landside wheel on the landside and the rear furrow wheel at the rear of the frame. Because the construction or relative arrangement of the various wheels form no part of this invention, I have not deemed it necessary to illustrate them.

The disc 14 is secured to the free end of arm 8 that is pivoted at 9 to the arm 6 as clearly shown in Figure 2, and bearing against one side of the arm 6 and extending to the arm 8 is a rod 11. This rod 11 is provided at one end with an aperture 11ᵃ through which a stem 12 passes and said plunger is secured to the arm 6 and at its opposite end the stem is provided with a head as shown.

At one end the rod 11 abuts against a spring 13 that surrounds the stem 12 at its opposite end the rod 11 is secured to the arm 8 by means of bolts 8ᵃ. It will be manifest that when the disc 14 strikes an objection the spring 13 will be placed under tension and immediately the objection has been passed, the release of tension will force the rod 11 toward frame 1 and hence the arms 6 and 8 will be moved to force the disc downwardly with respect to the frame 1.

The arm 6 is provided with a bored end and secured to arm 6 is an arm 7 that is likewise bored at its outer end. The arms 6 and 7 are thus secured by a rod or pin 5 to a block 2, having the upstanding portions 4 that are likewise bored to receive pin or rod 5. To prevent casual displacement of the pin any form of fastening means may be used to retain the pin in proper position.

The block 2 extends under beam 1 (Fig. 3) and is secured thereto by a strap 3.

Arranged on the arm 6 is a projection 6ᵃ that extends over frame or beam 1 and hence the disc 14 will be prevented from dropping too deep with respect to the frame, and secured to the frame 1 is a spring 10 that is also secured to the arm 6 so as to permit proper tension between frame 1 and arms 6 and 8 during the rise and fall of the disc over an obstruction.

The device is intended to be secured to the side of the frame 1 and rest substantially level therewith, i. e. the arms 3 and 5 rest level when in their normal position. However, when an obstruction is encountered the disc 14 moves upwardly moving arms 6 and 8 in the same direction and placing springs 10 and 13 under tension thus permitting the disk to ride easily over an obstruction. After the obstruction is passed the springs expand and hence the disk is forced into its normal working position.

It will be gathered from the foregoing that compression spring is not secured to the disc but to the swinging arm 6 and is compressed by backward swing of disk 14. The arms 6 and 8 will also rise when the disc strikes an obstruction and will be seated by gravity and tension spring 10 and hence there are two movements of arms 6 and 8 one sideways and the other up and down movement.

Having described my invention, what I claim and desire to secure by Letters-Patent is:—

1. In means for the purpose set forth, the combination of a frame, a block secured thereto, arm secured to the block, an arm pivoted to one of the first named arms, a spring abutting a portion of one of the first named arms and a spring secured to the frame and one of the first named arms and a disc arranged on the last named arm.

2. In means for the purpose set forth, the combination of a frame, a beam adjacent thereto, a projection formed on the beam and secured to the frame, a portion secured to the frame and pivotally secured to the beam, a rod secured to the beam, a stem secured to the beam, a spring surrounding the stem and abutting at one end on the rod, a spring secured to the frame and beam, an arm pivotally secured to the frame and a disc secured to the arm, whereby when the disc strikes an obstruction the beam and arm will move in an upwardly and downwardly as a sideways manner with respect to the frame.

3. In a wheel disc plow, the combination of a frame, a block secured thereto, upstanding portion formed on the block and having apertures in their upper ends, an arm arranged adjacent the frame and secured thereto, a spring attached to the arm and frame, an eye formed at one end of the arm, a short arm bolted to the inner face of the arm and having an eye in its outer end whereby a pin may be passed through the aperture of the upstanding portions of the block and the eyes of the arms to secure the arms to the block in pivotal manner, a rod secured on the outer face of the arm, a stem secured to said arm and passing through the rod, a spring surrounding the stem and retained between the rod and outer end of the stem, an arm pivotally secured to the outer end of the first named arm, and a disc secured on the last named arm, substantially as and for the purpose set forth.

In testimony whereof I have hereunto set my hand in presence of two subscribing witnesses.

JOHN H. CALDWELL.

Witnesses:
W. W. WOOLLY,
E. M. DAVIS.